United States Patent [19]

Hoyer et al.

[11] 4,244,222
[45] Jan. 13, 1981

[54] INSTRUMENTATION PROBE

[75] Inventors: John Z. Hoyer; John C. Scott, both of Cincinnati, Ohio

[73] Assignee: General Electric Company, Cincinnati, Ohio

[21] Appl. No.: 8,361

[22] Filed: Feb. 1, 1979

[51] Int. Cl.³ .................... G01K 1/08; G01K 13/02
[52] U.S. Cl. .................... 73/349; 73/861.65; 136/230
[58] Field of Search .......... 73/343, 116, 351, 349, 73/357, 212

[56] References Cited

U.S. PATENT DOCUMENTS

| 2,291,448 | 7/1942 | Bragg | 136/231 |
|---|---|---|---|
| 2,688,844 | 9/1954 | McLeod et al. | 73/212 X |
| 2,756,596 | 7/1956 | Nelson et al. | 73/349 X |
| 2,946,221 | 7/1960 | Annear et al. | 73/212 |
| 2,971,997 | 2/1961 | Carrico | 136/231 |
| 3,451,862 | 6/1969 | Burgess, Jr. et al. | 136/231 |
| 3,653,976 | 4/1972 | Miller et al. | 136/231 |
| 3,940,988 | 3/1976 | Reed | 73/349 |

FOREIGN PATENT DOCUMENTS

| 0759268 | 10/1956 | United Kingdom | 73/349 |
|---|---|---|---|
| 1088032 | 10/1967 | United Kingdom | 73/349 |
| 1269770 | 4/1972 | United Kingdom | 73/349 |

*Primary Examiner*—Daniel M. Yasich
*Attorney, Agent, or Firm*—Carl L. Silverman; Derek P. Lawrence

[57] ABSTRACT

An improved instrumentation probe is disclosed for use within a turbomachine, including an airfoil, such as of a vane, having a portion of its airfoil leading edge removed. The probe is disposed adjacent to the airfoil to replace the removed airfoil leading edge portion and to aerodynamically form the leading edge of the airfoil.

4 Claims, 5 Drawing Figures

INSTRUMENTATION PROBE

BACKGROUND OF THE INVENTION

1. Field of the Invention

The present invention relates generally to turbomachinery and, more particularly, to an instrumentation probe for use within a turbomachine.

2. Description of the Prior Art

The measurement of physical properties of fluids such as temperatures and pressures is routinely required for properly controlling the operation of sophisticated turbomachinery such as gas turbine engines. Instrumentation probes, such as the Temperature Sensor Probe described and claimed in U.S. Pat. No. 3,451,862, have been utilized to make such physical property measurements.

Prior art gas turbine engines have employed numerous such instrumentation probes independently mounted on an engine casing and extending into the engine gas flow at various axial engine locations having relatively unobstructed gas flow, such as structural frame elements. For example, in one family of fan jet engines, the exhaust gas temperatures and pressures are sensed by probes located in a structural frame which couples the high pressure turbine to the low pressure turbine.

Although the prior art approach has had generally satisfactory results, the independently mounted probes tend to produce aerodynamic separation and wakes in the gas stream which decrease the overall efficiency of the engine. In addition, in the development of some modern gas turbine engines, efficiency improvement programs have resulted in the elimination of unnecessary weight, including some of the structural frames upon which the prior art instrumentation was mounted. For example, in one such engine the structural frame which couples the high pressure turbine to the low pressure turbine has been eliminated and the two turbines have been moved closer together. In this engine, it is not practical to place an exhaust gas temperature or pressure probe in the free stream space between the two turbines since to do so may result in pressure pulses which would be reflected upstream upon the high pressure turbine rotating blades. It is also undesirable to axially shift the location of such an exhaust gas probe since the probe must remain in the same precise axial location in order to maintain a high level of sensitivity.

SUMMARY OF THE INVENTION

It is therefore an object of the present invention to provide an instrumentation probe which does not significantly detract from the overall efficiency of the turbomachine in which it is employed.

It is another object of the present invention to provide such a probe which is not independently mounted within a structural frame member.

Briefly stated, these objects, as well as additional objects and advantages which will become apparent from the following detailed description and the appended drawings and claims, are accomplished by the present invention which provides an improved instrumentation probe for a turbomachine. The turbomachine includes an airfoil, such as a portion of a vane, which has had a portion of its airfoil leading edge removed. The instrumentation probe is disposed adjacent to the airfoil to replace the removed airfoil leading edge portion and to aerodynamically form the leading edge of the airfoil. The probe may also be aerodynamically formed to have the same cross-sectional size and shape as the removed airfoil leading edge portion.

DESCRIPTION OF THE PREFERRED EMBODIMENT

Figure 1:
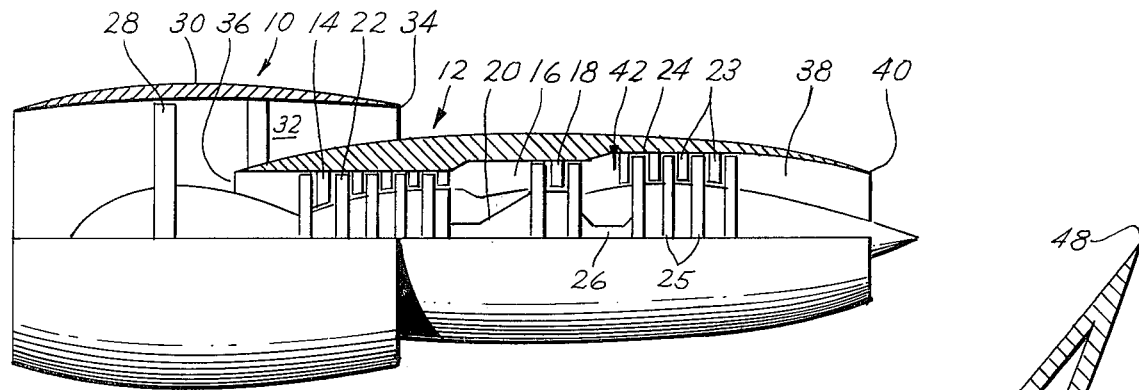
FIG. 1 is a schematical cross section of a typical gas turbine engine which includes in one form the improved instrumentation probe of the present invention.

Referring to the drawing wherein like numerals correspond to like elements throughout, reference is first directed to FIG. 1 wherein a typical gas turbine engine, shown generally as 10, is depicted as including in one form, the present invention. The engine 10 is comprised of a core engine or core 12, which includes in serial flow relationship, an axial flow compressor 14, a combustor 16, and a high pressure turbine 18. The high pressure turbine 18 is drivingly connected to the compressor 14 by a shaft 20 and a core rotor 22. The engine 10 is also comprised of a low pressure system, which includes a low pressure turbine 24 which is drivingly connected by a low pressure shaft 26 to a fan assembly 28. An outer nacelle 30 is spaced apart from the core engine 12 to define a bypass duct 32 therebetween.

In operation, air enters the engine 10 and is initially compressed by the fan assembly 28. A first portion of this compressed fan air enters the bypass duct 32 and is subsequently discharged through a fan bypass nozzle 34 to provide a first propulsive force. The remaining portion of the compressed fan air enters an inlet 36, is further compressed by the compressor 14 and is discharged into the combustor 16 where it is burned with fuel to provide high energy combustion gases. The combustion gases pass through and drive the high pressure turbine 18 which, in turn, drives the compressor 14. The combustion gases subsequently pass through and drive the low pressure turbine 24 which, in turn, drives the fan 28. The combustion gases then pass along an exhaust flowpath 38 whereupon they are discharged from a core exhaust nozzle 40 thereby providing a second propulsive force.

The foregoing description is typical of a present-day turbofan engine; however, as will become apparent from the following description, the present invention may also be employed in conjunction with any other turbomachinery, including any other type of gas turbine engine, for example a turboprop, turbojet, turboshaft, etc. The above description of the turbofan engine, depicted in FIG. 1, is therefore merely meant to be illustrative of one such application of the present invention.

Figure 3:
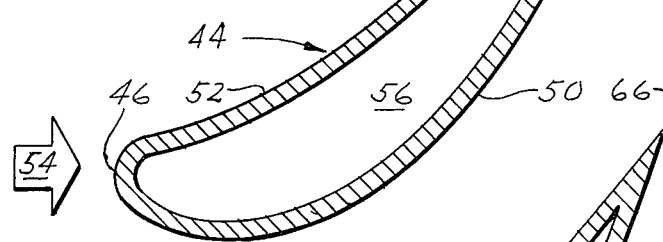
FIG. 3 is an axial cross-sectional view of a typical low pressure turbine vane.

As is known in the art, the low pressure turbine 24 of the engine 10 is comprised of a plurality of nozzle or vane stages 23 which direct the flow of the high energy combustion gases onto a plurality of turbine rotor blades or buckets 25. Referring now to FIG. 3, there is depicted a cross-sectional view of the airfoil portion of a typical individual turbine nozzle or vane 44. The airfoil of the hollow vane 44 includes a forward or leading edge 46 and a trailing edge 48. The airfoil shape provides a suction or convex surface 50 and a pressure or concave surface 52, both of which act to direct the flow of the high energy gases (shown by flow arrow 54). Cooling fluid from any suitable source, for example compressor bleed air, may be introduced into the vane 44 through the use of a suitable insert means (not shown) within the hollow inner portion 56 of the vane 44.

Figure 2:
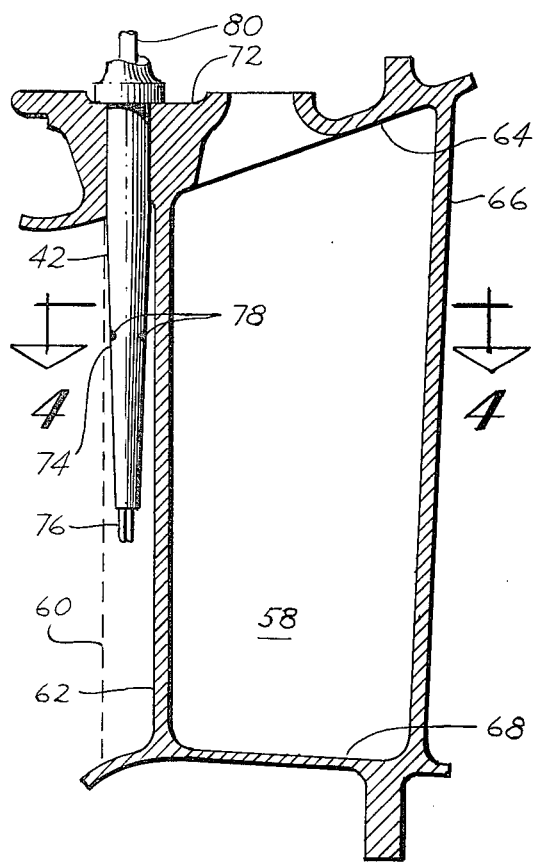
FIG. 2 is an enlarged view of one form of the present invention as utilized in conjunction with a stage one vane of the low pressure turbine of the engine depicted in FIG. 1.
Figure 4:
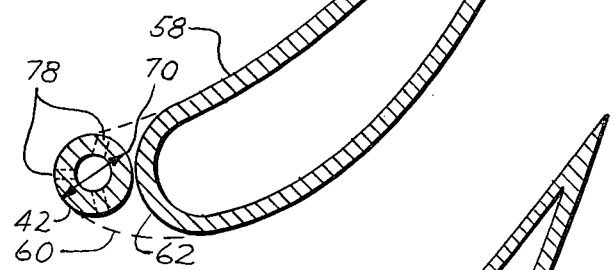
FIG. 4 is an axial cross-sectional view of a portion of FIG. 2 taken along the line 4—4.

Referring now to FIGS. 2 and 4, there is depicted a truncated turbine vane 58 having a portion of its original airfoil leading edge 60 removed (shown in phantom). The remaining portion of the truncated vane 58 has an indented leading edge 62 comprised of a shortened axial chord. The truncated vane 58 also includes an outer band platform 64, a trailing edge 66, and an inner band platform 68. With the exception of the removed leading edge portion 60, vane 58 is essentially the same as the above-described typical vane 44.

An instrumentation probe 42 (also shown in highly schematic form in FIG. 1) which in this embodiment is a temperature probe, is disposed adjacent to the indented leading edge 62 of the truncated vane 58 to replace the removed vane airfoil leading edge portion 60. It should be understood, however, that this is not intended to be a limitation on the present invention which may equally include a pressure probe or any other type of instrumentation probe. In this embodiment, the probe 42 is generally circular in cross section and has a diameter 70 which is substantially the same as the width of the removed vane leading edge portion 60. Thus, the probe 42 is positioned and sized to aerodynamically form the leading edge of the vane airfoil, thereby avoiding the gas flow losses associated with aerodynamic separation and wakes which are created by an independently mounted probe. The probe 42 is supported in a cantilevered fashion by an integrally cast and drilled boss 72 on the vane outer band platform 64. It should be understood that although the probe described in this embodiment is circular in cross section, this is not intended as a limitation on the present invention which may be of any aerodynamically suitable shape. As shown in FIGS. 2 and 4, in one such embodiment, the probe is tapered with the cantilevered end thereof having a larger diameter than the opposing end thereof and with the probe being in spaced relation to the indented leading edge 62.

As is typical in this art, a pair of thermocouple junctions are embedded within the probe 42 (not shown) at the approximate radial midpoint 74 and at the radial innermost end 76. Three small openings 78 allow the combustion gases to flow through the probe wall to the midpoint thermocouple junction at location 74. A plurality of wires (shown only for purposes of illustration on FIG. 2 as a single wire 80) conducts temperature responsive electrical signals generated by the thermocouple junctions at locations 74 and 76 to other parts of the engine 10, for example the control system (not shown). The two electrical signals may then be electrically combined and averaged in a fashion known in the art in order to provide the engine control system with an accurate indication of the temperature of the combustion gases as they enter the low pressure turbine 24. The control system may then utilize the temperature information in conjunction with information which is received from other parts of the engine to adjust the temperature of the combustion gases in order to improve overall engine efficiency or to prevent the premature deterioration of engine components.

Figure 5:
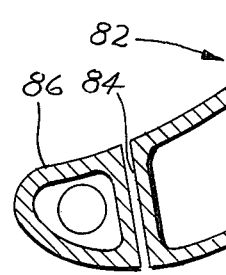
FIG. 5 is an axial cross-sectional view of a modified stage one low pressure turbine vane, including an alternate embodiment of the present invention.

An alternate embodiment of the present invention is depicted in FIG. 5. Vane 82 is substantially the same as the above-described typical vane 44 except that a portion of its airfoil leading edge has been removed. The remaining portion of the vane 82 has an indented and straightened leading edge 84.

An instrumentation probe 86, which in this embodiment is also a temperature probe but which could also be a pressure probe or any other type of instrumentation probe, is disposed adjacent to the indented leading edge 84 of the vane 82 to replace the removed airfoil leading edge portion. The probe 86 is aerodynamically formed to have substantially the same cross-sectional size and shape as the removed vane airfoil leading edge portion which it has replaced. Thus, the probe 86 is positioned and sized to aerodynamically form the leading edge of the vane airfoil, thereby avoiding gas flow losses associated with aerodynamic separation and wakes which are created by an independently mounted probe.

From the foregoing, it can be seen that the present invention provides a turbomachinery instrumentation probe which does not significantly detract from the overall efficiency of the turbomachine in which it is employed. It will be recognized by one skilled in the art that changes may be made to the above-described invention without departing from the broad inventive concept thereof. It is to be understood, therefore, that this inventive is not limited to the particular embodiments as above disclosed, but it is intended to cover all modifications which are within the scope and spirit of the invention as set forth in the appended claims.

What is claimed is:

1. In a turbomachine of the type having a compressor, a high pressure turbine and a low pressure turbine and including an airfoil of the type having a leading edge, a trailing edge, an outer band platform, an inner band platform, and having a portion of the leading edge removed, wherein the improvement comprises:

an instrumentation probe for measuring properties of the turbomachine gas flow, said probe extending through an aperture in the outer band platform wherein the probe is supported by the outer band platform in cantilevered fashion, said probe being disposed adjacent to the remaining leading edge of the airfoil and in spaced relation therewith to substantially replace at least a portion of the removed leading edge portion and to aerodynamically form at least a portion of the leading edge of the airfoil wherein the instrumentation probe is aerodynamically positioned and sized with a circular cross-sectional shape having a diameter substantially the same as the width of the removed leading edge portion to reduce gas flow losses associated with aerodynamic separation of the probe and the airfoil and wherein the remaining leading edge comprises an indented leading edge in the form of a shortened axial chord.

2. The apparatus as recited in claim 1 wherein the instrumentation probe is elongated and includes an outer end and an inner end with the inner end being disposed nearer to the inner band platform than the outer end and wherein the diameter of the probe decreases along the length of the probe from the outer end to the inner end thereof.

3. In a turbomachine of the type having a compressor, a high pressure turbine and a low pressure turbine and including an airfoil of the type having a leading edge, a trailing edge, an outer band platform, an inner band platform, and having a portion of the leading edge removed, wherein the improvement comprises:

an instrumentation probe for measuring properties of the turbomachine gas flow, said probe extending through an aperture in the outer band platform wherein the probe is supported by the outer band platform in cantilevered fashion, said probe being disposed adjacent to the remaining leading edge of the airfoil and in spaced relation therewith to substantially replace at least a portion of the removed leading edge portion and to aerodynamically form at least a portion of the leading edge of the airfoil wherein the instrumentation probe is aerodynamically positioned and sized to have substantially the same cross-sectional size and shape as the removed leading edge portion to reduce gas flow losses associated with aerodynamic separation of the probe and the airfoil and wherein the remaining leading edge comprises an indented leading edge in the form of a straightened edge.

4. The apparatus as recited in claims 3 or 1 wherein the airfoil is a portion of a vane of said low pressure turbine and the instrumentation probe is a temperature probe.

* * * * *